(12) United States Patent
Zhang et al.

(10) Patent No.: US 10,493,890 B2
(45) Date of Patent: Dec. 3, 2019

(54) FASTENERS FOR A VEHICLE CARPET

(71) Applicant: Ford Global Technologies LLC, Dearborn, MI (US)

(72) Inventors: Jason Zhang, Nanjing (CN); Cliff Ruan, Nanjing (CN); Peter Zhang, Nanjing (CN); Yoyo Ma, Nanjing (CN)

(73) Assignee: Ford Global Technologies LLC, Dearborn, MI (US)

( * ) Notice: Subject to any disclaimer, the term of this patent is extended or adjusted under 35 U.S.C. 154(b) by 129 days.

(21) Appl. No.: 15/676,707

(22) Filed: Aug. 14, 2017

(65) Prior Publication Data

US 2018/0065531 A1   Mar. 8, 2018

(30) Foreign Application Priority Data

Sep. 6, 2016 (CN) .......................... 2016 1 0803933

(51) Int. Cl.
*F16B 37/08* (2006.01)
*B60N 3/04* (2006.01)

(52) U.S. Cl.
CPC .......... *B60N 3/046* (2013.01); *F16B 37/0857* (2013.01); *F16B 37/0864* (2013.01)

(58) Field of Classification Search
CPC .. B60N 3/046; F16B 37/0857; F16B 37/0864; F16B 37/0842
USPC ................................ 16/4, 6, 8; 411/433, 437
See application file for complete search history.

(56) References Cited

U.S. PATENT DOCUMENTS

| | | | | |
|---|---|---|---|---|
| 4,728,236 A * | 3/1988 | Kraus | ................. | F16B 37/0842 24/662 |
| 4,802,804 A * | 2/1989 | Hirohata | ............. | F16B 37/0842 411/433 |
| 4,828,444 A * | 5/1989 | Oshida | .................. | F16B 37/043 411/437 |
| 4,850,778 A * | 7/1989 | Clough | ............... | F16B 37/0842 411/433 |
| 5,509,182 A | 4/1996 | Nakanishi | | |
| 5,816,762 A * | 10/1998 | Miura | ................. | F16B 37/0842 411/433 |
| 5,941,670 A * | 8/1999 | Sano | .................... | F16B 37/0842 411/433 |
| 6,381,806 B1 | 5/2002 | Stanesic et al. | | |
| 7,891,151 B2 | 2/2011 | Sano | | |
| 8,950,993 B2 * | 2/2015 | Gagne | ................. | F16B 37/0842 411/433 |

(Continued)

FOREIGN PATENT DOCUMENTS

DE     19617408 A1 *  8/1997 ............. B60N 3/046
KR     19980030522 U    8/1998

(Continued)

*Primary Examiner* — Emily M Morgan
(74) *Attorney, Agent, or Firm* — Vichit Chea; Kolitch Romano LLP (57) ABSTRACT

The present disclosure provides a fastener for a vehicle carpet. The fastener includes a receiving portion having a first open end and a second open end, a flange connected at the first open end of the receiving portion, and a plurality of engaging parts disposed on an inner wall of the receiving portion and spaced apart along a perimeter of the inner wall. Each of the engaging parts has two flexible end sections connected with the inner wall of the receiving portion and a threaded section between the two flexible end sections.

15 Claims, 4 Drawing Sheets

(56) References Cited

U.S. PATENT DOCUMENTS

2008/0181748 A1* 7/2008 Rosemann .......... F16B 37/0857
                                              411/431
2018/0128299 A1* 5/2018 Katabira ............. F16B 37/0857

FOREIGN PATENT DOCUMENTS

| WO | 2011118173 A1 | 9/2011 |
| WO | 2015112423 A1 | 7/2015 |

* cited by examiner

FIG. 7

FASTENERS FOR A VEHICLE CARPET

RELATED APPLICATION

This application claims the benefit of Chinese Patent Application No.: CN 201610803933.3 filed on Sep. 6, 2016 the entire contents thereof being incorporated herein by reference.

FIELD

The present disclosure relates to fasteners, more particularly to a fastener for a vehicle carpet.

BACKGROUND

A carpet in a vehicle is usually fixed on a floor of the vehicle by a plurality of fasteners to avoid undesired impact on other vehicle parts such as a braking pedal and accelerating pedal due to movements of the carpet. Conventionally, the carpet is fixed on the floor by a bolt and nut connection. For example, a threaded bolt is welded on the floor and a carpet with a hole is placed on the floor to make the bolt pass the hole. Then, a threaded nut is connected with the bolt and the threaded nut presses on the floor to secure the carpet on the floor. Because the bolts on the floor of different vehicles have variable diameters, different nuts are required to match with the bolts. During the assembling process of the carpet, it is possible to mount an unmatched nut to the bolt, thus mounting error may be caused. If an operator selects a nut with a relative smaller inner diameter to mount on a bolt with a relative larger diameter, he or she may need to replace this nut with a correct one, which increases the mounting time. U.S. Pat. No. 7,891,151B2 discloses two-clip tubular fastener used to clamp a sheet-like member between flanges of the clips. The flanges of the fasteners exert a predetermined clamping force on an undercover while permitting planar movement of the undercover. One of the flanges has a configuration that engages a co-operable configuration on the undercover to prevent undesired turning of a first clip relative to a second clip. However, this kind of fastener has a complicated structure and low fastening strength. There is a need for a fastener with a simple structure, strong fastening strength, and suitable for the bolts having different diameters.

SUMMARY

The present disclosure provides a fastener for a vehicle carpet to at least address some of the issues described above. The fastener has a simple structure, easy to manufacture, low manufacturing cost, strong fastening strength, easy to mount, and convenient for maintenance and replacement.

According to one aspect of the present disclosure, a fastener for a vehicle carpet is provided. The fastener includes a receiving portion having a first open end and a second open end, a flange connected at the first open end of the receiving portion, and a plurality of engaging parts disposed on an inner wall of the receiving portion and spaced apart along a perimeter of the inner wall. Each of the engaging parts has two flexible end sections connected with the inner wall of the receiving portion and a threaded section between the two flexible end sections.

In some embodiments, the receiving portion is a hollow cylinder, and the threaded sections of the plurality of engaging parts define a discontinuous threaded portion to collectively match a threaded bolt.

In some embodiments, each threaded section is spaced apart from the inner wall of the receiving portion with a predetermined distance, and the flexible end section of the engaging part is deformable in a radial direction of the receiving portion such that the threaded portion has a variable diameter.

In some embodiments, the engaging parts and the receiving portion are integrally formed.

In some embodiments, the receiving portion further includes a plurality of through holes corresponding to the plurality of engaging parts, and the two flexible end sections of the engaging part are connected to two opposite ends of a corresponding through hole, respectively.

In some embodiments, the engaging parts are spaced apart evenly on the inner wall of the receiving portion.

In some embodiments, two flexible end sections of each engaging part are arranged at a height direction of the receiving portion, the flexible end section is formed as a deformable sheet having a first edge connected with the inner wall of the receiving portion and a second edge connected with a corresponding threaded section, the first edge is closer to the first open end or second open end of the receiving portion relative to the second edge, and deformable sheets of the engaging parts define a part of a cone.

In some embodiments, the plurality of the engaging parts includes three engaging parts.

In some embodiments, the fastener includes one engaging part connected along the entire inner perimeter of the receiving portion. The engaging part has two flexible end sections connected with the entire inner perimeter of the receiving portion at two different heights and one continuous threaded section between the first and second flexible end sections.

In some embodiments, two flexible end sections of each engaging part are arranged along a perimeter of the inner wall of the receiving portion.

In some embodiments, two flexible end sections of the engaging part are arranged at a same height at the inner wall of the receiving portion.

In some embodiments, the engaging parts are arranged at a same height or at different heights at the inner wall of the receiving portion.

According to another aspect of the present disclosure, a fastener for a vehicle carpet is provided. The fastener includes a receiving portion, a flange connected to an end of the receiving portion, and a plurality of engaging parts disposed at an inner wall of the receiving portion. The receiving portion is configured to be received in a mounting hole of the carpet and has a first open end and a second open end opposing the first end and being adjacent to a floor of the vehicle at a mounted position. The flange is connected at the first open end of the receiving portion and has an outer diameter larger than a diameter of the mounting hole of the carpet. The engaging parts are spaced apart along a perimeter of the inner wall. Each engaging part has two flexible end sections connected with the inner wall of the receiving portion and a threaded section between the two flexible end sections. Threaded sections of the engaging parts form a discontinuous threaded portion to be engaged with a bolt fixed on the floor of the vehicle.

In some embodiments, the threaded section of each engaging part is spaced apart from the inner wall of the receiving portion with a predetermined distance. The flexible end section of each engaging part is deformable in a radial direction of the receiving portion such that the threaded portion has a variable diameter to be engaged with bolts with different diameters.

In some embodiments, the flexible end sections of each engaging part are made from material including polypropylene and talc, and the talc has a content of 0 to 20 wt %.

In some embodiments, the engaging parts and the receiving portion are integrally formed. The receiving portion has a plurality of through holes corresponding to the engaging parts. Two flexible end sections of each engaging parts are connected to two opposite sides of a corresponding through hole respectively.

In some embodiments, two flexible end sections of each engaging part are arranged along a height direction of the receiving portion. One flexible end adjacent to the first open end of the receiving portion has a surface inclined towards the second open end. The other flexible end adjacent to the second open end has a surface inclined towards the first open end.

In some embodiments, the fastener further includes a reinforcing part disposed at the inner wall of the receiving portion between two adjacent engaging parts. The reinforcing part has a thickness smaller than a distance between the threaded section of the engaging part and the inner wall of the receiving portion, and the reinforcing part are integrally formed with the receiving portion and the engaging parts.

In some embodiments, the fastener further includes a cover connected to the flange to block the first open end of the receiving part.

In some embodiments, the cover includes a first end pivotally connected to the flange and an opposite second end connected with the flange via snap fit.

In some embodiments, the fastener further includes a plurality of protrusions formed on a lower surface of the flange to be contacted with the carpet, and the protrusions have cross-sections of a triangle, an arch, a rectangle, a trapezoid, and combinations thereof.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

The above advantages and other advantages, and features of the present description will be readily apparent from the following detailed description when taken alone or in connection with the accompanying drawings.

DETAILED DESCRIPTION

Embodiments of the present disclosure are described herein. It is to be understood, however, that the disclosed embodiments are merely examples and other alternative embodiments can take various forms. The figures are not necessarily to be drawn in scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A carpet in a vehicle is usually fixed to a vehicle floor by a plurality of fasteners. It is desirable that the fastener has sufficient fastening strength to prevent the carpet from moving or sliding on the floor while has asthetic appearance.

Figure 1:
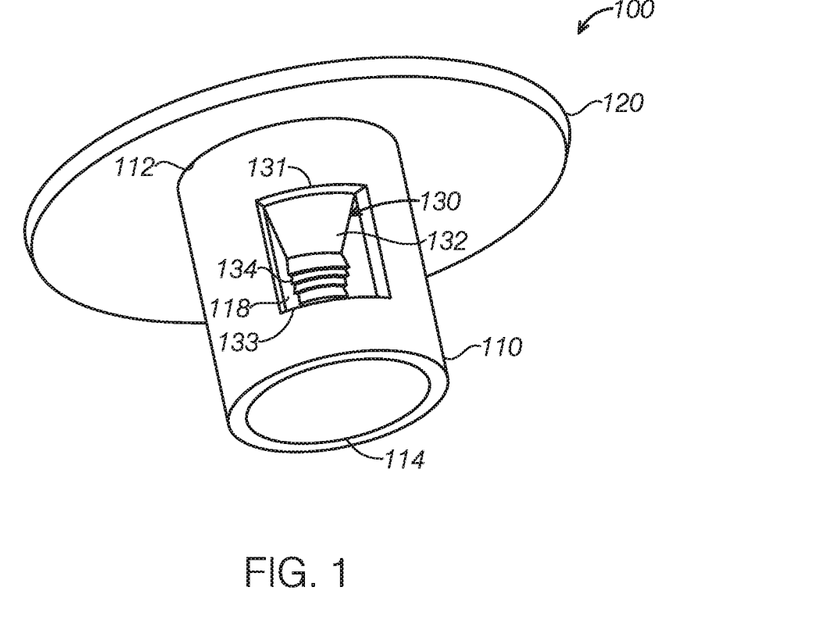
FIG. 1 is a perspective view of a fastener for a vehicle carpet according to an embodiment of the present disclosure.
Figure 2:
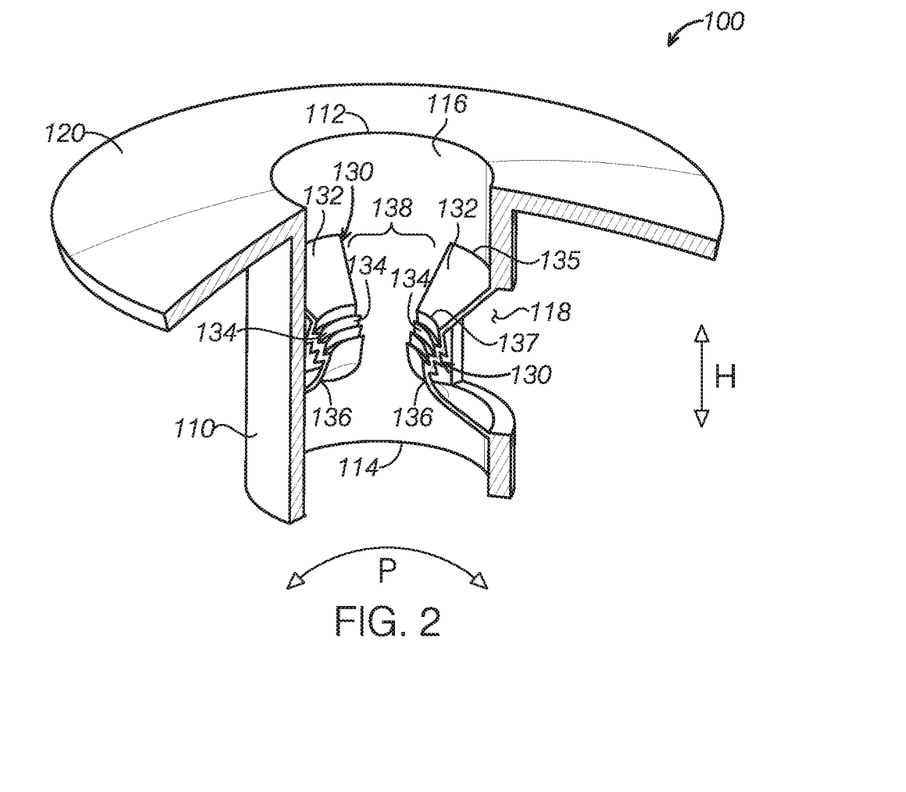
FIG. 2 is a cutaway diagram of the fastener in FIG. 1, illustrating two engaging parts connected at an inner wall of a receiving portion of the fastener.
Figure 3:
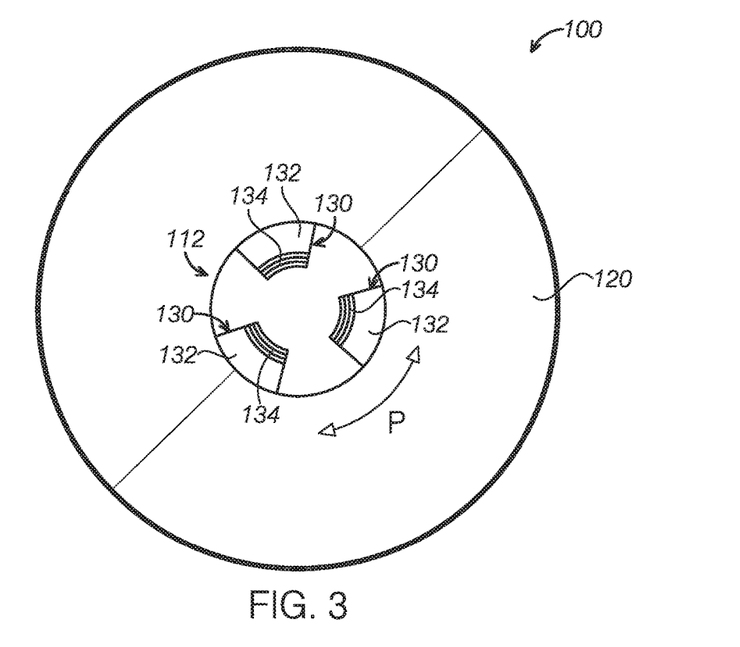
FIG. 3 is a top view of the fastener in FIG. 1.

FIG. 1 is a perspective view of a fastener for a vehicle carpet according to an embodiment of the present disclosure. FIG. 2 is a cutaway perspective view of a part of the fastener in FIG. 1, illustrating two engaging parts connected at an inner wall of a receiving portion of the fastener. FIG. 3 is a top view of the fastener in FIG. 1. Referring to FIG. 1, FIGS. 2 and 3, a fastener 100 for a vehicle carpet may include a receiving portion 110, a flange 120 connected at an end of the receiving portion, and a plurality of engaging parts 130 disposed in the receiving portion 110. The receiving portion 110 may have a first open end 112, a second open end 114 opposite to the first open end 112, and a housing between the first and second open ends 112, 114 for receiving or retaining a bolt fixed on a floor of the vehicle. The first and second open ends 112, 114 are an upper end and a lower end of the receiving portion 110, respectively. The flange 120 may be connected at an end of the receiving portion 110, such as the first open end 112.

In some embodiments, the fastener 100 may include a plurality of engaging parts 130. The engaging parts 130 are disposed man inner wall 116 of the receiving portion 110 and spaced apart along a perimeter of the inner wall 116. As shown in FIG. 2, each engaging part 130 may has two flexible end sections connected with the inner wall 116 of the receiving portion 110, e.g., a first flexible end section 132 and a second flexible end section 136. Each engaging part 130 may include a threaded section 134 connected between the first and second flexible ends 132, 136.

In some embodiments, the engaging parts 130 and the receiving portion 110 may be integrally formed. In this way, the fastener 100 may be manufactured in one molding process, and thus it is easy to make and have low manufacturing cost. The receiving portion 110 may have a plurality of through holes 118 corresponding to the engaging parts 130. Two flexible end sections of each engaging parts 130 may be connected at two opposite edges of a corresponding through hole 118, respectively. Referring to FIG. 1, each through hole 118 has an upper edge 131 and a lower edge 133 opposite each other and connected with the first and second flexible end sections 132, 136 of a corresponding engaging part 130 respectively. It should be appreciated that, the through holes 118 may be formed during a molding process of the fastener 100. The molding process may be performed by properly designing molding tool, which are known to those with ordinary skills in the art and will not be described herein.

In some embodiments, the through holes 118 may be formed in the receiving portion 110 in one step, and then each engaging part 130 is connected to two opposite ends of a corresponding through hole 118 in a following step.

In some embodiments, the receiving portion 110 may be a hollow cylinder which has a housing therein to receive the engaging parts 130. Although the receiving portion 110 are shown as a hollow cylinder shape in FIGS. 1-3, it should be appreciated that the receiving portion 110 may have other shape, e.g., the receiving portion 110 may have a cross-section of a polygon, such as a rectangle or a trapezoid. Referring to FIGS. 2 and 3, the threaded sections 138 of the engaging parts 130 form a threaded portion 138 in the receiving portion 110. The threaded portion 138 may have a discontinuous thread shape, i.e., the threaded portion 138 has gaps therein in direction P. The threaded portion 138 may be engaged with a cylindrical bolt, for example, a threaded blot fixed on the floor or the vehicle.

In some embodiments, the threaded section 134 of each engaging part 130 may be spaced apart from the inner wall 116 of the receiving portion 110 with a predetermined distance. For example, the threaded section 134 is positioned in the housing of the receiving part 110 and spaced apart with the inner wall 116 while the first and second flexible end sections 132, 136 are connected with the receiving portion 110. The first and second flexible end sections 132, 136 are deformable in a radial direction of the receiving portion 110, such that the threaded portion 138 may have a variable diameter. As shown in FIG. 2, when the threaded portion 138 is to be engaged with a fastener such as a bolt with a diameter larger than the inner diameter of the current threaded portion 138, the first and second flexible end sections 132, 136 of the engaging part 130 at the right side may bend upwards and downwards, respectively, such that the threaded section 134 of the engaging part 130 at the right side may move towards the inner wall 116 of the receiving portion 110 during engagement between the bolt and the threaded portion 138. That is, the entire engaging part 130 at the right side may move toward the right. Similarly, other engaging parts 130 may deform to move towards the inner wall 116 of the receiving portion 110. In this way, the inner diameter of threaded portion 138 may, increase to engage with the bolt having a relative larger diameter. As described, the fastener 100 may match with a connecting part such as bolts having various different diameters, which may be used in vehicles of different models, and can simplify the process for fixing the carpet on the floor and the following maintenance.

In some embodiments, as shown in FIG. 2, the first and second flexible end sections 132, 136 of each engaging part 130 are arranged at a height direction H of the receiving portion 110. The first and second flexible end sections 132, 136 may constructed as deformable sheets. Each deformable sheet may have a first edge 135 connected at the inner wall 116 of the receiving portion 110 and a second edge 137 connected with the threaded section 134. The first edge 135 of the first flexible end section 132 may be closer to the first open end 112 relative to the second edge 137. That is, the first flexible end section 132 may have an inclined surface to the inner wall 116 of the receiving portion 110. Similarly, a first edge or a lower edge of the second flexible end section 136 may be closer to the second open end 114 of the receiving portion 110 relative to the second edge or an upper edge of the second flexible end section 136. The second flexible end section 136 may have an inclined surface to the inner wall 116 of the receiving part 110. The first or second flexible end sections 132, 136 of the engaging parts 130 may form a portion of a cone. Referring to FIG. 2, the second flexible end section 136 has a surface inclined towards the inner wall 116 in an upper-down direction. The inclined surfaces of the engaging pails 130 form a guiding surface to facilitate the insertion of the bolt into the threaded portion 138 and removal from the threaded portion 138.

In some embodiments, the engaging parts 130 of the fastener 100 are spaced apart evenly on the inner wall 116 along a circumferential direction P or an inner perimeter of the housing at a cross section. Referring to FIG. 3, the fastener 100 includes three engaging parts 130 evenly spaced apart on the inner wall 116 of the receiving portion 110 in the direction P. As shown in FIG. 3, the fastener 100 includes three engaging parts 130 and each engaging part 130 has a threaded section 134. Three threaded sections 134 of these three engaging parts 130 form a discontinuous threaded portion 138 to be cooperated with the bolt fixed on the floor of the vehicle. Although three engaging parts 130 are shown in FIG. 3, it should be appreciated that the fastener 100 may include other numbers of engaging parts 130 spaced in the receiving portion 110 to be cooperated with the bolt. In some embodiments, the fastener may include only one engaging part connected along the entire inner perimeter of the receiving portion (not shown). The engaging part has two flexible end sections connected with the entire inner perimeter of the receiving portion at two different heights and a continuous threaded section between the first and second flexible end sections is formed. The flexible end sections may deform or bend in a radial direction of the receiving portion such that the threaded portion could match with bolts with different diameters.

Figure 4:
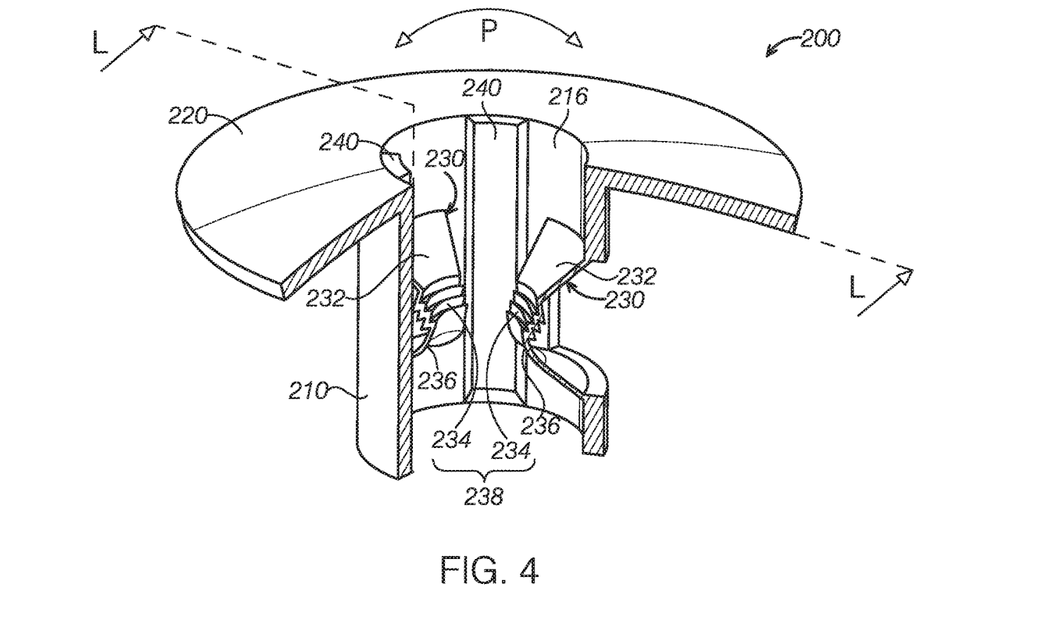
FIG. 4 is a cutaway perspective view of a part of a fastener for a vehicle carpet according to another embodiment of the present disclosure, illustrating a reinforcing part connected at an inner wall of a receiving portion of the fastener.
Figure 5:
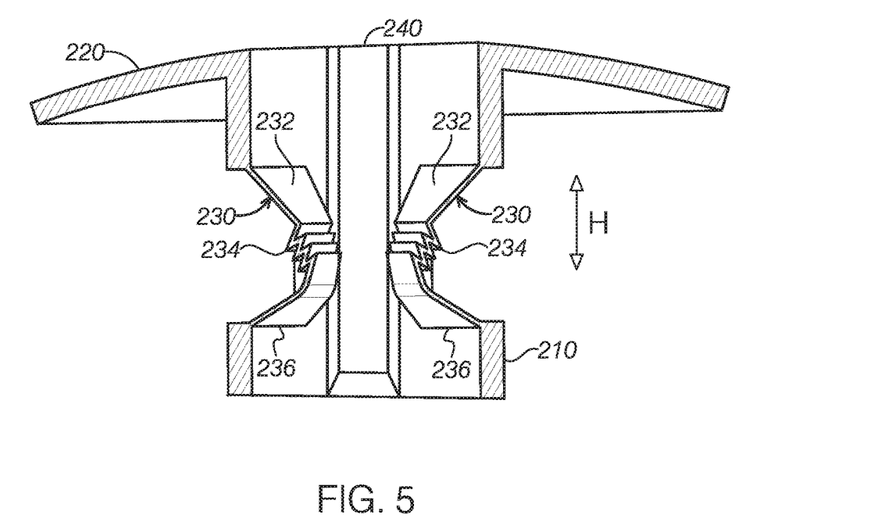
FIG. 5 is a perspective view of the fastener in FIG. 4 along line L-L.

FIG. 4 is a perspective view of a fastener 200 for a vehicle according to another embodiment of the present disclosure. FIG. 5 is a cross-sectional view of the fastener 200 in FIG. 5 along Line L-L. Similar to the fastener 100 of the above embodiment, the fastener 200 may include a receiving portion 210 having opposite open ends, a flange 220 connected at one open end of the flange 220, and a plurality of engaging parts 230 connected to the receiving portion 210. The engaging parts 230 are disposed at an inner wall 216 of the receiving portion 210 and spaced apart along a perimeter of the inner wall 216. Each engaging part 230 has two flexible end sections connected with the inner wall 216 of the receiving portion 210, such as a first flexible end section 232 and a second flexible end section 236. Each engaging part 230 includes a threaded section 234 connected between the first and second flexible ends 232, 236. The plurality of threaded sections 234 form a discontinuous threaded portion 238 in the receiving portion 210. The threaded section 234 may be spaced apart from the inner wall 216, and the first and second flexible end sections 232, 236 may deform or bend in a radia direction of the receiving portion 210, such that the threaded portion 238 may have a variable inner diameter. In this way, the fastener 200 can cooperate with connectors (e.g., bolts fixed on a floor of the vehicle) with different diameters to fix the carpet on the floor of the vehicle, and can be used for vehicles with different models. The engaging part 230 of the fastener 200 is similar to the engaging part of the fastener 100 as described above. For the sake of brevity, the detailed structure of be described.

The fastener 200 may further include a reinforcing part 240 disposed on the inner wall 216 between two adjacent engaging parts 230. The reinforcing part 240 can increase the strength of the fastener 200, thus the fastener 200 does not deform at the height direction. The reinforcing part 240 may have a thickness smaller than the distance between the threaded section 234 and the inner wall 216. The reinforcing part 240 may be integrally formed with the receiving portion 210, the flange 220, and the engaging parts 230, thus the entire fastener 200 may be integrally formed, such that the fastener 200 may have a simple manufacturing process and low manufacturing cost. The reinforcing part 240 may extend along the height direction of the receiving portion 210 at the inner wall 216. In other words, the reinforcing part 240 may have a height substantially equal to that of the receiving portion. In some embodiments, the height of the reinforcing part 240 may be smaller than the height of the receiving portion 210. Similar to the engaging parts 230, the fastener 200 may include a plurality of reinforcing part 240 disposed at the inner wall 216 and spaced apart evenly in the direction P. In such embodiments, the engaging parts 230 and the reinforcing parts 240 are arranged alternately at the inner wall 216 in the direction P.

Figure 6:
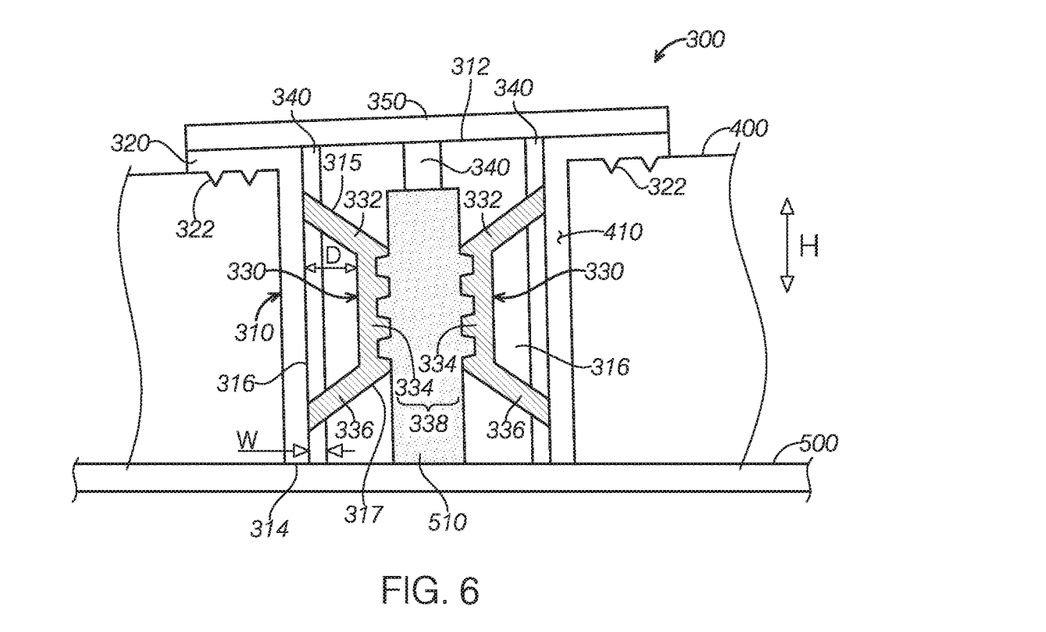
FIG. 6 is a cross-sectional view of a fastener for a vehicle carpet according to another embodiment of the present disclosure, illustrating the connection among the fastener, the carpet, and a floor of the vehicle.

FIG. 6 is a cross-sectional view of a fastener 300 for a vehicle according to another embodiment of the present disclosure, illustrating the connections among a carpet 400, a floor 500 of the vehicle, and the fastener 300 at a mounted position. As can been seen in FIG. 6, the fastener 300 includes a receiving portion 310, a flange 320 connected at an end of the receiving portion 310, and a plurality of engaging parts 330 connected to the receiving portion 310. The receiving portion 310 may be configured to be received or retained in a mounting hole 410 of the carpet 400. The receiving portion 310 has two opposite open ends, i.e., a first open end 312 and a second open end 314. The first open end 312 is connected with the flange, and the second open end 314 is adjacent to or rest on the floor 500 of the vehicle at the mounted position.

The flange 320 connected at the first open end 312 of the receiving portion 310, has an outer diameter larger than a diameter of the mounting hole 410. In this way, the flange 320 may cover the mounting hole 410 and press against the carpet 400 to secure the carpet 400 on the floor 500 of the vehicle. In addition, the flange 320 may act as a cover to prevent dusts or debris from entering into the mounting hole 410.

Similar to the fasteners 100 and 200 described in the above embodiments, the engaging parts 330 of the fastener 300 are disposed on an inner wall 316 of the receiving portion 310 and spaced apart along a perimeter of an inner wall 316 of the receiving portion 310. Each engaging part 330 has two flexible end sections (such as a first flexible end section 332 and a second flexible end section 336) and a threaded section 334 connected between these two flexible end sections. Threaded sections 334 of the engaging parts 330 may form a discontinuous threaded portion 338 to be engaged with a bolt 510 mounted on the floor 500 of the vehicle, such that the carpet 400 may be fixed on the floor 500 via the fastener 300.

Similar to the fasteners 100 and 200 described above, the threaded section 334 of the engaging part 330 are spaced apart from the inner wall 316 of the receiving portion 310, two flexible end sections of the engaging part 330 may deform or bend in a radial direction of the receiving portion 310. In this way, the threaded portion 338 formed by the threaded sections 334 may have a variable inner diameter to match with the bolts 510 with various different diameters.

In some embodiments, the engaging part 330 may be formed from polypropylene (PP) and talc. For example, the engaging part 330 may include PP and talc, and the content of talc in the engaging part 330 may be in a range of 0 to 20 wt %. The flexible end sections of the engaging parts 330 with pp as described above have desired flexibility or elasticity while maintaining required stiffness, thus the fastener 300 may be engaged with the bolts with different diameters and maintaining robust connection therebetween. It should be appreciated that those with ordinary skills in the art may change the composition of the material of the flexible end sections or the engaging part according to practical requirements so as to obtain an engaging part with required properties, such as flexibility or stiffness. Such modifications are construed to be in the scope of the present disclosure. In some embodiments, the fastener are integrally formed from the material of PP and talc.

Similar to the fasteners 100 and 200 described above, the engaging parts 330 and the receiving portion 310 of the fastener 300 may be integrally formed. The receiving portion 310 may have a plurality of through holes corresponding to the engaging parts 330. Two flexible end sections of each engaging part 330 may be connected at two opposite edges of a corresponding through hole respectively.

It should be appreciated that, the fastener 300 may be integrally formed. Constitutions of other parts of the fastener may refer to the above description of engaging part 330.

In some embodiments, the two flexible end sections of each engaging part 330 may be substantially arranged at a height direction H of the receiving portion 310. The first flexible end section 332 may have a surface 315 inclined towards the second open end 314 of the receiving portion 310, the second flexible end section 336 may have a surface 317 inclined towards the first open end 312 of the receiving portion 310. With the inclined surfaces, the flexible end sections may guide the fastener 300 towards the bolt during assembling and disassembling process. For example, the surface 317 of the second flexible end section 336 may guide the threaded portion 334 of the engaging part 330 to move along the bolt 510, which facilitates the contact and connection between the engaging part 330 and the bolt 510.

Similar to the fastener 200 described above, the fastener 300 may include a reinforcing part 340 disposed on the inner wall 316 and between two adjacent engaging parts 330. The reinforcing part 340 may have a thickness W smaller than a distance D between the threaded section 334 of the engaging part 330 and the inner wall 316.

It should be appreciated that, other parts of the fastener 300, such as the receiving portion, the flange 320, the engaging parts 330, and the reinforcing part 340 are similar to those of the fasteners 100 and 200 as described above with reference to FIGS. 1-5, and will not be described herein.

In some embodiments, as shown in FIG. 6, the fastener 300 further includes a cover 350 connected with the flange 320. The cover 350 may have a shape corresponding to a profile of the flange 320 and configured to block the first open end 312 of the receiving portion 310, thus preventing dust or debris from entering into the interior of the fastener 300. The cover 350 may have a first end pivotably connected with the flange 320 and a second end fixed to the flange 320 and opposite to the first end (not shown). The first end of the cover 350 may be connected with the flange 320 via a conventional pivot structure (for example, a pivot and the rotational part) to pivot about the flange. The second end of the cover 350 may be connected with the other end of the flange 320 via a snap fit. In this way, when the cover 350 is to open, the snap fit of the cover is released and the first end of the cover 350 may be operated to pivot about the first end of the cover 350 to open.

In some embodiments, the flange 320 of the fastener 300 may include a plurality of protrusions 322 on a surface contacting the carpet 400 thereof, that is, a lower surface of the flange 320 in FIG. 6. As shown in FIG. 6, the protrusion 322 may have a cross-section of triangle. It should be appreciated that the protrusion may have any suitable cross-sections such as a triangle, an arch, a rectangle, a trapezoid, and combinations thereof. The protrusions 322 may increase the friction between the fastener 300 and the carpet 400, thus providing a more reliable connection therebetween to prevent the carpet 400 from sliding or moving on the floor 500 of the vehicle. In this way, the carpet 400 is fixed on the floor 500 more stably.

Figure 7:
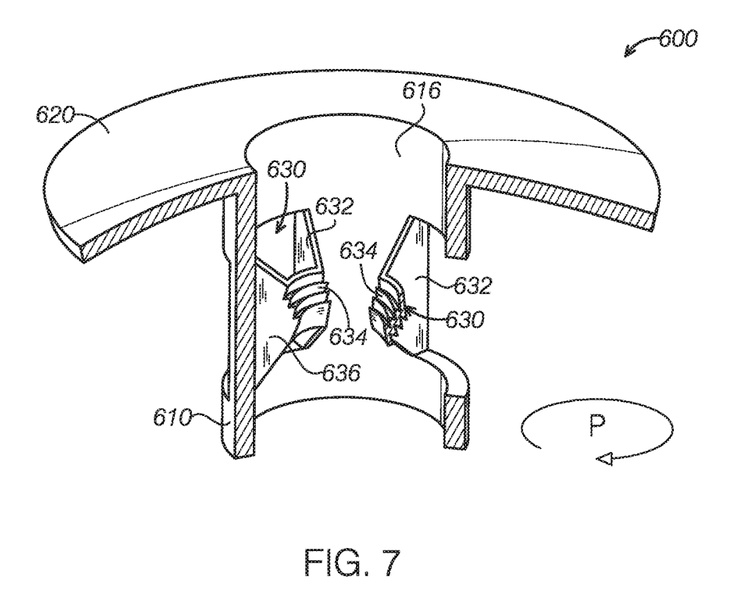
FIG. 7 is a cutaway perspective view of a part of a fastener for a vehicle carpet according to another embodiment of the present disclosure.

FIG. 7 is a perspective view of a part of a fastener 600 for a vehicle. The fastener 600 may include a receiving portion 610 having opposite open ends, a flange 620 connected at one open end of the receiving portion 610, and a plurality of engaging parts 630 connected to the receiving portion 610. The engaging parts 630 are disposed on an inner wall 616 of the receiving portion 610 and spaced apart along a perimeter of the inner wall 616. Each engaging part 630 may have two flexible end sections connected with the inner wall 616 (i.e., a first flexible end section 632 and a second flexible end section 636) and a threaded section 634 connected between the first and second flexible end sections 632, 636. Threaded sections 634 of the engaging parts 630 form a discontinuous threaded portion 638 in the receiving portion 610. The treaded part 634 of the engaging part 630 may be spaced apart from the inner wall 616 and the first and second flexible end sections 632, 636 may deform or bend in a radial direction of the receiving portion 610, such that the threaded portion 638 may have a variable inner diameter.

In the embodiment shown in FIG. 7, two flexible end sections of each engaging part 630 may be arranged at a circumferential direction P of the inner wall 616. For example, two flexible end sections of the engaging part 630 are positioned at left and right sides of the threaded section 634, instead of upper and lower side of the threaded section as shown in FIG. 2. In some embodiments, the first and second flexible end sections 632, 636 may be arranged at a same height on the inner wall 616. Different engaging parts 630 may be arranged at a same height or different heights of the inner wall 616 of the receiving portion. Other parts of the fastener 600 may have similar structures to the fasteners as described above in association with FIGS. 1-6 and will not be described in detail.

The fastener for a vehicle carpet of the present disclosure have a variable inner diameter to match the bolts with different dimensions. Thus, the fasteners can be adopted to a wide range of applications, such as being used as fasteners for carpets at different positions of the vehicle or different models of the vehicles. In addition to the ability to adopt the different bolts, the connection between the fastener and the bolts is robust due to the connection by the threaded portions.

The fasteners of the present disclosure may be used in a passenger vehicle, a commercial vehicle, or various other vehicles, such as agriculture machines, transportation ships, or airplanes. Those applications should be considered as included in the scope of term "vehicle" cited in this disclosure.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions.

The invention claimed is:

1. A fastener for a vehicle carpet, comprising:
   a receiving portion having a first open end and a second open end;
   a flange connected at the first open end of the receiving portion; and
   a plurality of engaging parts disposed on an inner wall of the receiving portion and spaced apart along a perimeter of the inner wall, wherein each of the engaging parts has two flexible end sections connected with the inner wall of the receiving portion and a threaded section between the two flexible end sections,
   wherein the plurality of the engaging parts include at least three engaging parts, and the threaded sections of the plurality of engaging parts define a discontinuous circular threaded portion, and
   wherein the two flexible end sections of each engaging part are deformable in a radial direction and bent toward each other and toward the inner wall of the receiving portion when being engaged with a threaded bolt with a diameter greater than an inner diameter of the threaded section at a non-deformed position, and an engaging surface of the threaded section of each engaging part is tilted towards the first open end at the non-deformed position, and wherein an inner diameter of the threaded section at a deformed position is greater than the inner diameter of the thread section at the non-deformed position, and wherein the engaging parts remain deformed when being engaged with the threaded bolt; and
   wherein the two flexible end sections of each engaging part are arranged along a height direction of the receiving portion, one flexible end portion adjacent to the first open end of the receiving portion has a surface inclined towards the second open end, another flexible end portion adjacent to the second open end has a surface inclined towards the first open end, the one flexible end portion and the another flexible end portion are inclined in two opposite directions.

2. The fastener of claim 1, wherein the receiving portion is a hollow cylinder.

3. The fastener of claim 2, wherein each threaded section is spaced apart from the inner wall of the receiving portion with a predetermined distance.

4. The fastener of claim 1, wherein the engaging parts and the receiving portion are integrally formed.

5. The fastener of claim 4, wherein the receiving portion further comprises a plurality of through holes corresponding to the plurality of engaging parts, and the two flexible end sections of the engaging part are connected to two opposite ends of a corresponding through hole, respectively.

6. The fastener of claim 1, wherein the engaging parts are spaced apart evenly on the inner wall of the receiving portion.

7. The fastener of claim 1, wherein the flexible end section is formed as a deformable sheet having a first edge connected with the inner wall of the receiving portion and a second edge connected with a corresponding threaded section, the first edge is closer to the first open end or the second open end of the receiving portion relative to the second edge, and deformable sheets of the engaging parts define a part of a cone.

8. A fastener for a vehicle carpet comprising:
a receiving portion adapted to be received in a mounting hole of the vehicle carpet and having a first open end and a second open end, the second open end opposing the first open end and being adjacent to a floor of a vehicle at a mounted position;
a flange connected at the first open end of the receiving portion and having an outer diameter larger than a diameter of the mounting hole of the vehicle carpet; and
at least three engaging parts disposed at an inner wall of the receiving portion and spaced apart along a perimeter of the inner wall,
wherein each engaging part has two flexible end sections connected with the inner wall of the receiving portion and a threaded section between the two flexible end sections,
wherein threaded sections of the engaging parts form a discontinuous circular threaded portion to match a profile of a threaded bolt fixed on the floor of the vehicle
wherein the two flexible end sections of each engaging part are deformable in a radial direction and bent toward each other and toward the inner wall of the receiving portion when being engaged with the threaded bolt with a diameter greater than an inner diameter of the threaded section at a non-deformed position, and an engaging surface of the threaded section of each engaging part is tilted towards the first open end at the non-deformed position, and wherein an inner diameter of the threaded section at a deformed position is greater than the inner diameter of the threaded section at the non-deformed position, and
wherein the two flexible end sections of each engaging part are arranged along a height direction of the receiving portion, one flexible end portion adjacent to the first open end of the receiving portion has a surface inclined towards the second open end, another flexible end portion adjacent to the second open end has a surface inclined towards the first open end, the one flexible end portion and the another flexible end portion are inclined in two opposite directions.

9. The fastener of claim 8, wherein the threaded section of each engaging part is spaced apart from the inner wall of the receiving portion with a predetermined distance.

10. The fastener of claim 8, wherein the flexible end sections of each engaging part are made from material including polypropylene and talc, and the talc has a content of 0 to 20 wt %.

11. The fastener of claim 8, wherein the engaging parts and the receiving portion are integrally formed, the receiving portion has a plurality of through holes corresponding to the engaging parts, two flexible end sections of each engaging parts are connected to two opposite sides of a corresponding through hole respectively.

12. The fastener of claim 8, further comprising a reinforcing part disposed at the inner wall of the receiving portion between two adjacent engaging parts, the reinforcing part has a thickness smaller than a distance between the threaded section of the engaging part and the inner wall of the receiving portion, and the reinforcing part are integrally formed with the receiving portion and the engaging parts.

13. The fastener of claim 8, further comprising a cover connected to the flange to block the first open end of the receiving portion.

14. The fastener of claim 13, wherein the cover comprises a first end pivotally connected to the flange and an opposite second end connected with the flange via snap fit.

15. The fastener of claim 8, further comprising a plurality of protrusions formed on a lower surface of the flange to be contacted with the vehicle carpet, and the protrusions have cross-sections of a triangle, an arch, a rectangle, a trapezoid, and combinations thereof.

* * * * *